United States Patent
Takasu et al.

(10) Patent No.: US 10,044,998 B2
(45) Date of Patent: Aug. 7, 2018

(54) PROJECTION APPARATUS, PROJECTION METHOD, AND STORAGE MEDIUM

(71) Applicant: CASIO COMPUTER CO., LTD., Tokyo (JP)

(72) Inventors: Akihide Takasu, Akishima (JP); Toru Takahama, Fussa (JP); Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/718,341

(22) Filed: Sep. 28, 2017

(65) Prior Publication Data
US 2018/0176523 A1 Jun. 21, 2018

(30) Foreign Application Priority Data
Dec. 19, 2016 (JP) .................. 2016-245511

(51) Int. Cl.
H04N 9/31 (2006.01)
(52) U.S. Cl.
CPC ......... *H04N 9/3194* (2013.01); *H04N 9/3155* (2013.01); *H04N 9/3182* (2013.01)
(58) Field of Classification Search
CPC .. H04N 9/3194; H04N 9/3155; H04N 9/3182; H04N 9/3147; H04N 9/3188; H04N 9/64; H04N 9/31; H04N 9/68; H04N 9/70
USPC ........ 348/177–179, 643, 645, 649, 671–673, 348/687, 690, 744
See application file for complete search history.

(56) References Cited

U.S. PATENT DOCUMENTS

| | | | | |
|---|---|---|---|---|
| 2013/0307773 | A1* | 11/2013 | Yagishita | H04N 9/3194 345/158 |
| 2016/0349948 | A1* | 12/2016 | Shigemitsu | H04N 9/3147 |

FOREIGN PATENT DOCUMENTS

| | | |
|---|---|---|
| JP | H10-93984 A | 4/1998 |
| JP | 2004-128575 A | 4/2004 |
| JP | 2004-184852 A | 7/2004 |
| JP | 2005-203859 A | 7/2005 |
| JP | 2007-259472 A | 10/2007 |
| JP | 2011-197645 A | 10/2011 |
| JP | 2015-37204 A | 2/2015 |

* cited by examiner

*Primary Examiner* — Sherrie Hsia
(74) *Attorney, Agent, or Firm* — Fitch, Even, Tabin & Flannery LLP (57) ABSTRACT

A projection apparatus includes a projection mode designation unit configured to designate one of a plurality of projection modes which designate at least one of a brightness and a color of the image which is projected by the projection unit; and a projection control unit configured to determine, based on the color information of the projection target surface acquired by the projection surface information acquisition unit and the projection mode designated by the projection mode designation unit, a gray scale range of each of colors constituting the image which is projected by the projection unit, and configured to cause the projection unit to project the image.

20 Claims, 7 Drawing Sheets

PROJECTION APPARATUS, PROJECTION METHOD, AND STORAGE MEDIUM

CROSS-REFERENCE TO RELATED APPLICATIONS

This application is based upon and claims the benefit of priority from Japanese Patent Application No. 2016-245511, filed Dec. 19, 2016, the entire contents of which are incorporated herein by reference.

BACKGROUND OF THE INVENTION

1. Field of the Invention

The present invention relates to a projection apparatus which projects an image on a projection target object other than an exclusive-use screen, a projection method, and a storage medium.

2. Description of the Related Art

Jpn. Pat. Appln. KOKAI Publication No. 2007-259472 proposes a technique relating to a projector which projects a color image. When a projection surface, such as a wall, has a color, correct color reproduction is not performed. Thus, mixture amounts of primary colors are corrected by a conversion matrix, by using a spectral reflectance of the projection surface or color information under a light source, and then projection is performed.

In the technique disclosed in Jpn. Pat. Appln. KOKAI Publication No. 2007-259472, a dynamic range is adjusted so that the color, pattern, etc. on the projection surface become less visible. Thus, how to determine the target values of white and black of an image, which is projected, is an important point. Usually, when an image, which becomes totally white, was projected by a projector, the projection range of the image is photographed by a camera. A pixel value, which is lowest and closest to black in the projection range of the photographed image, is set as a target value of white. Similarly, when a black image (an approximate black image with a color close to black, and with a brightness of, for example, 10 [%] of a white image) was projected, the projection range of the black image is photographed by the camera. A pixel value, which is highest and closest to white in the projection range of the photographed image, is set as a target value of black.

However, in some cases, if the color correction is performed by the above method of determining the target values of white and black, the dynamic range decreases and the contrast deteriorates considerably. In addition, when the reflectance of light at a specific position is extremely low, the color correction itself may become impossible.

The present invention has been made in consideration of the above-described circumstances, and it is an object of the invention to provide a projection apparatus, a projection method, and a storage medium, capable of performing projection even on a projection target object that is not an exclusive-use screen, with an image quality on which a user's intention is reflected.

SUMMARY OF THE INVENTION

According to one aspect of the present invention, there is provided a projection apparatus comprising: a projection unit configured to project an image; a projection image acquisition unit configured to acquire a projection image on a projection target surface on which the image was projected by the projection unit; a projection surface information acquisition unit configured to acquire, from the projection image acquired by the projection image acquisition unit, color information at a bright time and a dark time on the projection target surface; a projection mode designation unit configured to designate one of a plurality of projection modes which designate at least one of a brightness and a color of the image which is projected by the projection unit; and a projection control unit configured to determine, based on the color information of the projection target surface acquired by the projection surface information acquisition unit and the projection mode designated by the projection mode designation unit, a gray scale range of each of colors constituting the image which is projected by the projection unit, and configured to cause the projection unit to project the image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment in a case in which the present invention is applied to a projector apparatus will be described in detail with reference to the accompanying drawings.

[Configuration]

Figure 1:
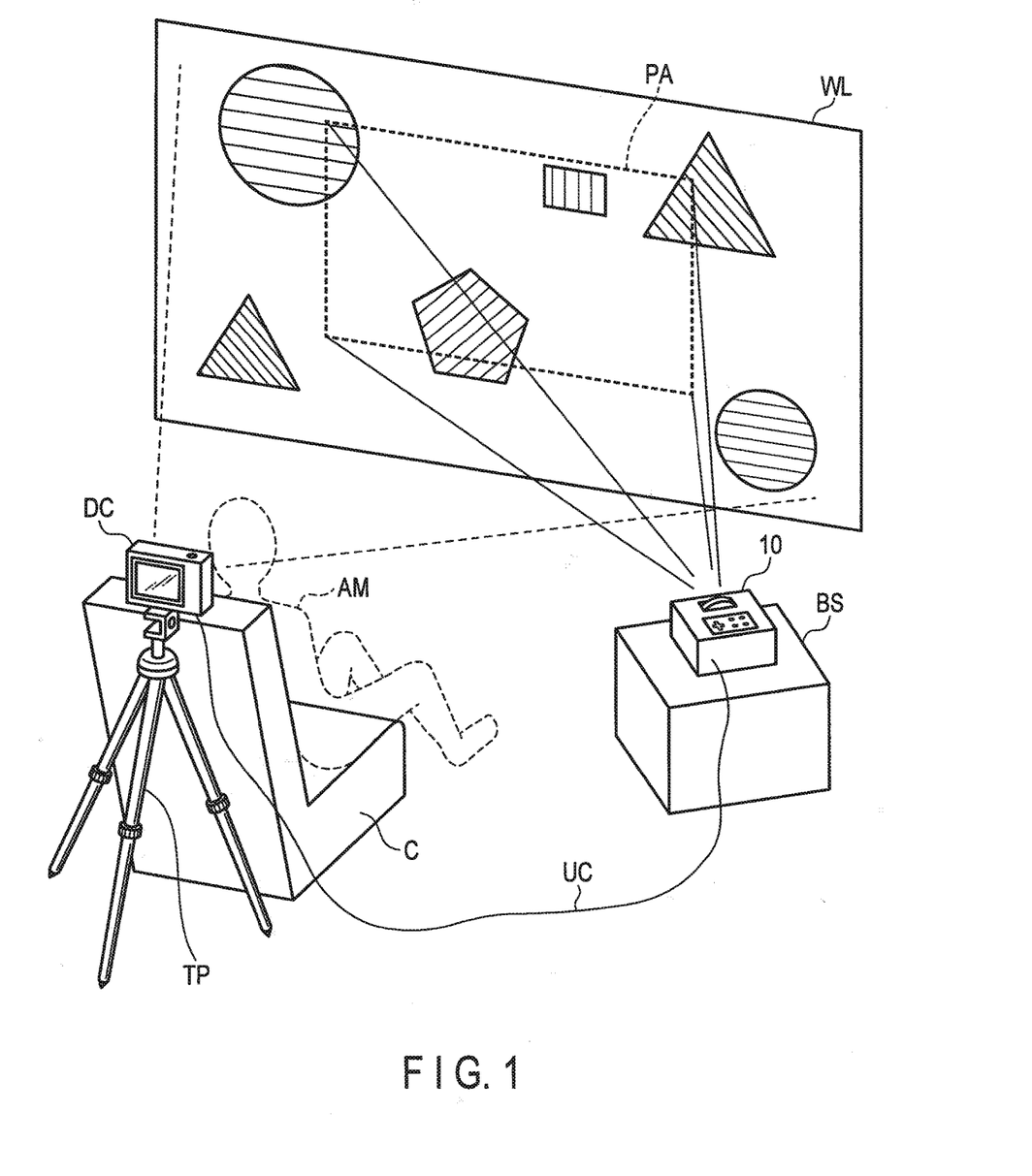
FIG. 1 is a view illustrating an environment in which a projector apparatus according to an embodiment of the present invention was initially installed.

FIG. 1 is a view illustrating an environment at a time of color-correction setting, which is initially executed when a projector apparatus 10 according to the present embodiment is installed at a place for projection.

FIG. 1 illustrates a state in which the projector apparatus 10 is placed on a base BS, and the projector apparatus 10 is projecting a totally white rectangular image for a test onto a wall surface WL which is substituted for a screen, from a position deviating from the front of the wall surface WL, that is, from a position set off to the right side as facing the wall surface WL in FIG. 1.

It is assumed that patterns of geometrical figures appear on the wall surface WL as illustrated in FIG. 1, and the background color is not white that is suited to image projection.

On the other hand, a chair C is disposed in front of the wall surface WL. In addition, in place of a viewer AM who is supposed to sit on the chair C, a digital camera DC, which is attached to a tripod TP, is disposed as close as possible to the positions of both eyes of the viewer AM. Specifically, the digital camera DC is disposed in order to recognize a projection range PA on the wall surface WL which can be viewed from the eyes of the viewer AM. Here, it is assumed that the digital camera DC is adjusted to have such a photography (zoom) view angle as to be capable of photographing a wide range of a surrounding area of the projection range PA which is located substantially at the center.

The digital camera DC and the projector apparatus 10 are wiredly connected by, for example, a USB (Universal Serial Bus) cable UC. Responding to a control command which is input from the projector apparatus 10 via the USB cable UC, the digital camera DC photographs an image including the wall surface WL and the projection range PA on the wall surface WL, and sends image data, which was acquired by the photography, to the projector apparatus 10 via the USB cable UC.

Figure 2:
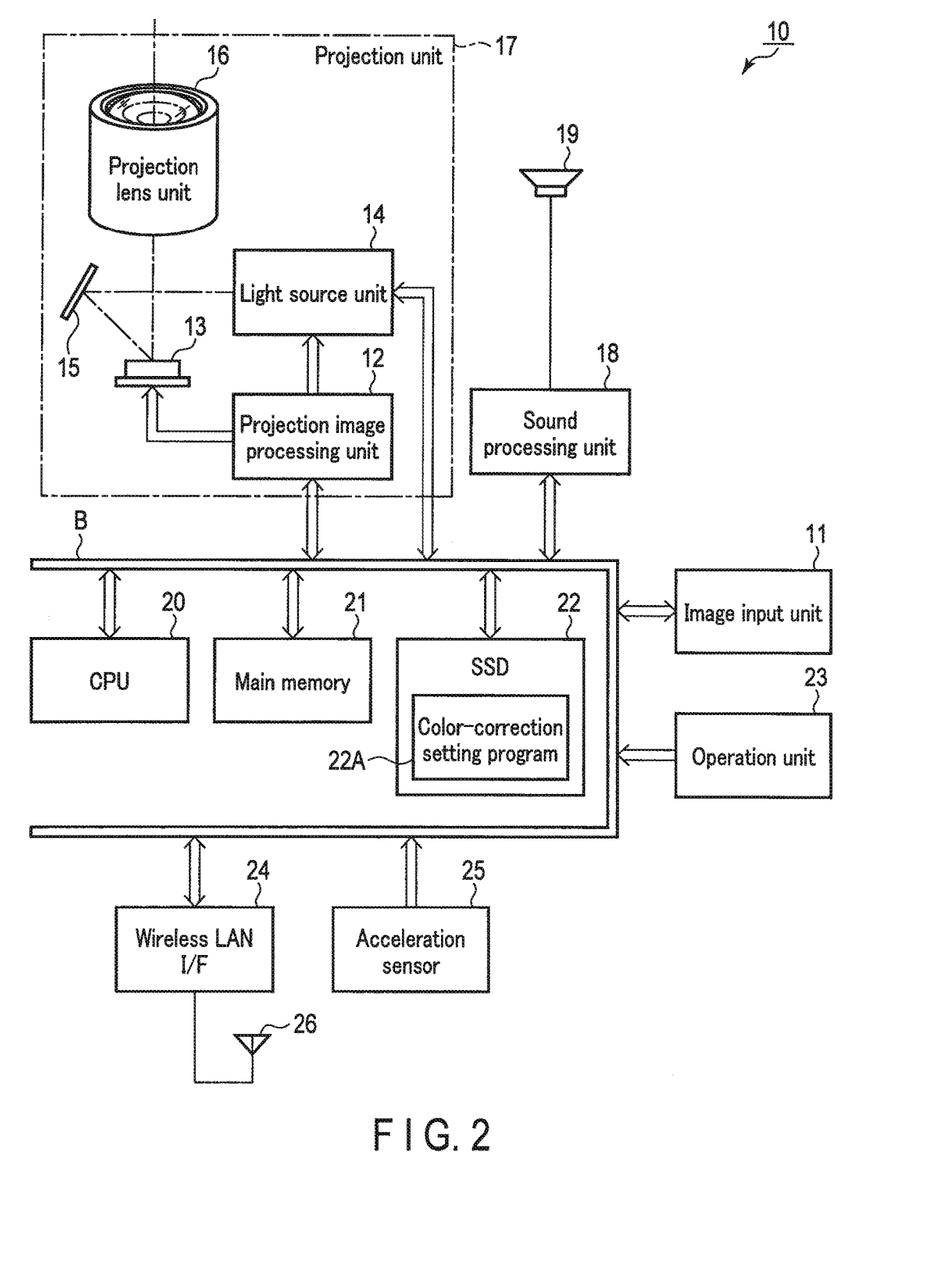
FIG. 2 is a block diagram illustrating a functional configuration of electronic circuitry of the projector apparatus according to the embodiment.

Next, referring to FIG. 2, a description will be given of a functional configuration of, mainly, electronic circuitry of the projector apparatus 10. In FIG. 2, an image input unit 11 is composed of, for example, a pin jack (RCA) type video input terminal, a D-sub15 type RGB input terminal, an HDMI (trademark) (High-Definition Multimedia Interface) terminal, and a USB terminal.

Analog or digital image signals of various standards, which are input to the image input unit 11 or are stored in a USB memory and selectively read out, are digitized by the image input unit 11, as needed, and then sent to a projection image processing unit 12 via a bus B.

The projection image processing unit 12 drives a micromirror element 13 which is a display element, by higher time-division drive obtained by multiplication of a frame rate following a predetermined format, for example, a double frame rate of 120 [frames/second] if the frame rate of input image data is 60 [frames/second], a division number of a color component, and the number of display gradations, in accordance with image data which was sent.

The micromirror element 13 executes a display operation by operating, with an individual high-speed ON/OFF operation, each inclination angle of a plurality of micromirrors corresponding to a plurality of pixels arranged in an array shape, for example, lateral 1280 pixels×longitudinal 960 pixels, thereby forming an optical image by reflection light.

On the other hand, a light source unit 14 cyclically emits lights of R, G, B primary colors in a time-division manner. The light source unit 14 includes LEDs which are semiconductor light-emitting elements, and repeatedly emits the lights of R, G, B primary colors in a time-division manner. The LEDs, which the light source unit 14 includes, may include, in a broad sense, LDs (semiconductor lasers) and organic EL elements. The primary-color lights from the light source unit 14 are total-reflected by a mirror 15 and radiated on the micromirror element 13.

An optical image is formed by the reflected light from the micromirror element 13, and the formed optical image is projected to the outside via the projection lens unit 16, and display is performed.

A projection unit 17 is configured to include the projection image processing unit 12, micromirror element 13, light source unit 14, mirror 15 and projection lens unit 16.

In addition, when the image signal, which is input from the image input unit 11, includes a sound signal, this sound signal is separated from the image signal by the image input unit 11, and the sound signal is sent to a sound processing unit 18 via the bus B. The sound processing unit 18 includes a sound source circuit such as a PCM sound source. The sound processing unit 18 converts a sound signal, which is delivered at a projection operation time, to an analog signal, and drives a speaker 19 to produce sound, or to produce a beep sound or the like when necessary.

A CPU 20 controls all operations of the above-described circuitry components. The CPU 20 is connected to a main memory 21 and an SSD (Solid State Drive) 22. The main memory 21 is composed of, for example, an SRAM, and functions as a work memory of the CPU 20. The SSD 22 is composed of an electrically rewritable nonvolatile memory, for example, a flash ROM. The SSD 22 stores various operation programs including a color-correction setting program 22A (to be described later), which are executed by the CPU 20, and various routine data, etc., such as an OSD (On Screen Display) image which is superimposed on an image that becomes a basic image.

The CPU 20 reads out the operation program, routine data, etc. stored in the SSD 22, and develops and stores them in the main memory 21, and then executes the operation program, thereby comprehensively controlling the projector apparatus 10.

The CPU 20 executes various projection operations in accordance with operation signals which are delivered from the operation unit 23 via the bus B. This operation unit 23 includes an operation key provided on the housing of the main body of the projector apparatus 10, or a light receiving unit which receives an infrared modulation signal from a remote controller (not shown) dedicated to this projector apparatus 10. The operation unit 23 accepts a key operation signal, and sends a signal corresponding to the accepted key operation signal to the CPU 20 via the bus B.

Furthermore, the CPU 20 is connected to a wireless LAN interface unit (I/F) 24 and an acceleration sensor 25 via the bus B.

The wireless LAN interface unit 24 transmits/receives data to/from an external device by a wireless communication connection via a wireless LAN antenna 26, for example, according to IEEE802.11a/11b/11g/11n.

The acceleration sensor 25 is configured to detect accelerations in three axial directions which are orthogonal to each other. The direction of gravitational acceleration is calculated from a detection output of the acceleration sensor 25. Thereby, it is possible to judge in what attitude this projector apparatus 10 is performing a projection operation.

Figure 3:
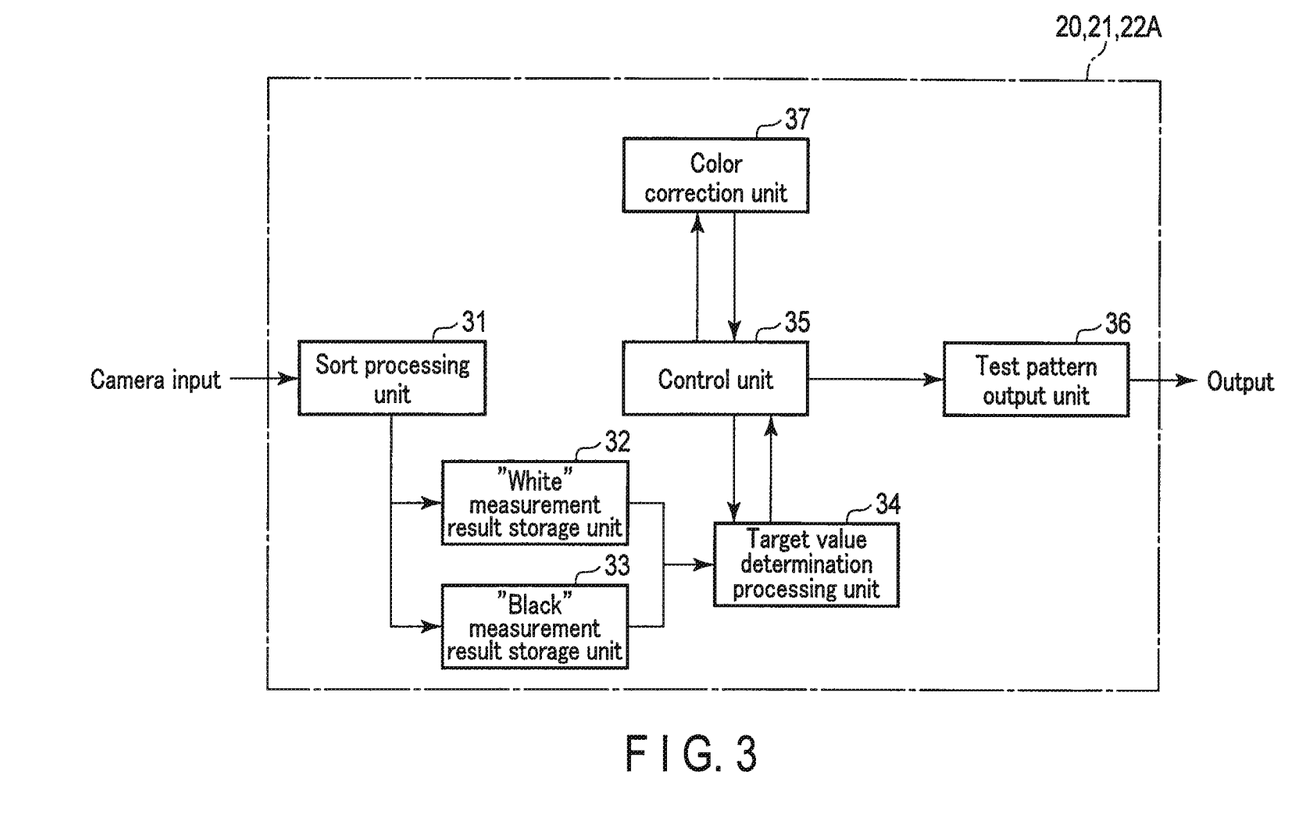
FIG. 3 is a block diagram illustrating a functional configuration of a color-correction setting process according to the embodiment.

FIG. 3 is a block diagram illustrating a functional configuration of a process which is executed after the CPU 20 read out the color-correction setting program 22A stored in the SSD 22 and developed this program 22A in the main memory 21. Instead of the control by the software using the color-correction setting program 22A, the configuration of FIG. 3 may be provided as hardware circuitry.

Photography image data of a range including the above-described projection range PA, which has been input from the digital camera DC via the image input unit 11, is input to a sort processing unit 31. This sort processing unit 31 sorts all pixels and all primary color components of the input image data.

In this case, the sort processing unit 31 sends a sort processing result of the image data, which was input when a totally white image was projected by the projection unit 17, to a "white" measurement result storage unit 32, and stores this sort processing result in the "white" measurement result storage unit 32. In addition, the sort processing unit 31 sends a sort processing result of the image data, which was input when a totally black image (0% of full gray scale) was projected by the projection unit 17, to a "black" measurement result storage unit 33, and stores this sort processing result in the "black" measurement result storage unit 33. The totally black image means a non-projection state.

The stored contents in the "white" measurement result storage unit 32 and "black" measurement result storage unit 33 are read out to a target value determination processing unit 34.

This target value determination processing unit 34 executes, under the control of a control unit 35, a process of determining a target gray scale value for projection and a target gray scale value of a black level for projection, and outputs the determination results to the control unit 35.

The control unit 35 causes a test pattern output unit 36 to output the above-described totally white image and totally black image to the projection unit 17, thereby projecting these images. On the other hand, the control unit 35 receives from the target value determination processing unit 34 the determined target gray scale value of the white level and the determined target gray scale value of the black level, and outputs these target gray scale values to a color correction unit 37.

Based on the target gray scale values of the white level and black level which were delivered from the control unit 35, the color correction unit 37 executes gray scale correction of each of primary color components in the range from the white level to black level, with respect to each of the pixels which constitute the image that is projected by the projection unit 17.

First Operation Example

Next, a first operation example of the present embodiment will be described.

Here, an operation in the following case will be described with reference to the drawings. In this case, in the initial setting before starting the projection of an arbitrary image by the projector apparatus 10, the projector apparatus 10 and digital camera DC are installed as illustrated in FIG. 1. In addition, the color correction state in the projector apparatus 10 is set in accordance with the state of the wall surface WL.

Figure 4:
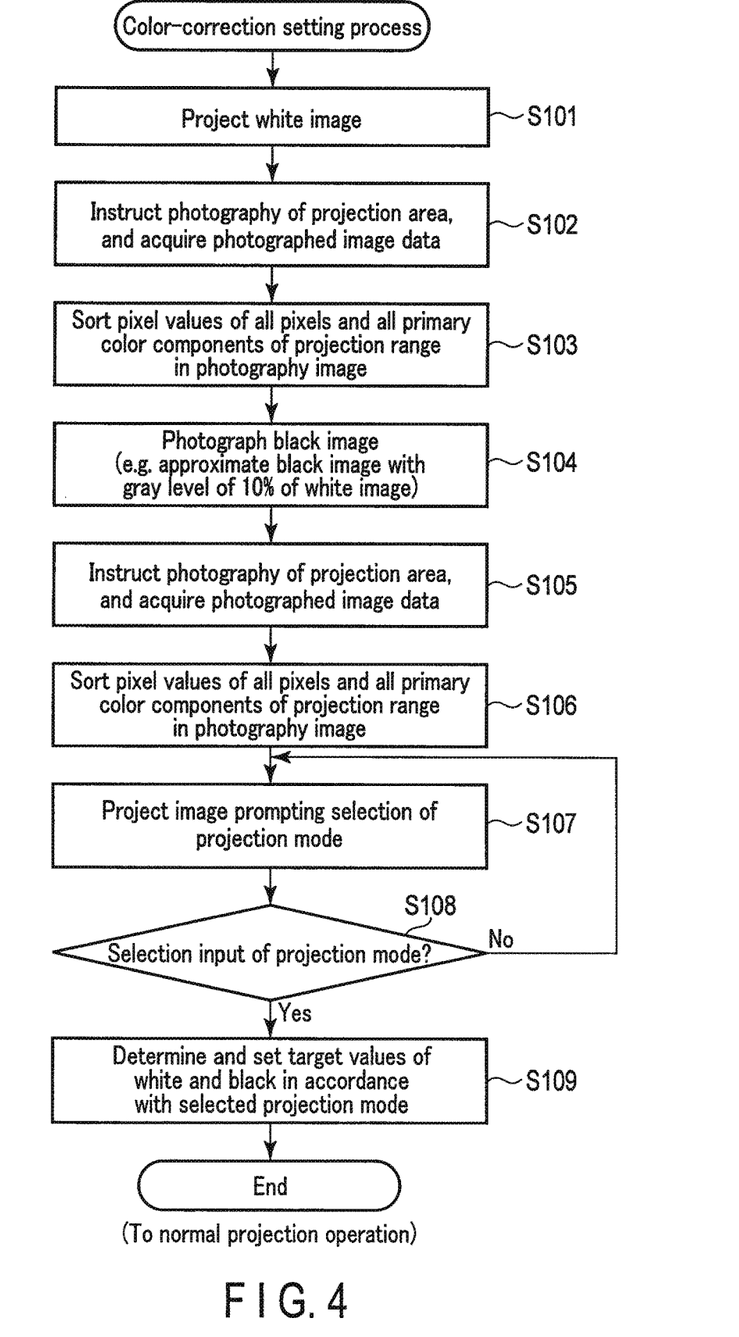
FIG. 4 is a flowchart illustrating a processing content in a first operation example according to the embodiment.

FIG. 4 is a flowchart illustrating a process content which is executed after the CPU 20 reads out the color-correction setting program 22A from the SSD 22, and develops and stores this program 22A in the main memory 21.

To start with, the CPU 20 causes the projection image processing unit 12 of the projection unit 17 to project a totally white image such that all pixels of the image, which is displayed by the micromirror element 13, have a full gray scale with respect to each of the primary color components of R, G and B (step S101).

In the projection state (bright time) of this white image, the digital camera DC is instructed, via the image input unit 11, to photograph an image including the projection range PA of the wall surface WL. Photography by this instruction is executed, and image data, which is sent from the digital camera DC, is acquired (step S102).

The CPU 20 executes a contour extraction process with respect to each of pixel values in the acquired image data, and distinguishes and recognizes the projection range PA and a surrounding area thereof. Then, the CPU 20 sorts the pixel values with respect to each of all pixels and all primary color components, which constitute the projection range PA, and holds the result of sorting (color information such as a color distribution) (step S103).

For example, the case is assumed in which the pixel value of a certain pixel in the photography image for the white image is (R, G, B)=(192, 201, 203) in an 8-bit gray scale "0 (zero gray scale value)"~"255 (full gray scale value)" with respect to each of the primary colors. In this case, in order to project uniform white in the entire image including the position of this pixel, it is assumed that R, B and G need to have the same value. Based on this assumption, the minimum gray scale value "192" is treated as illuminance information of the white pixel at the position of this pixel. Specifically, (R, G, B)=(192, 192, 192) is treated as illuminance information of the white pixel at the position of this pixel.

Next, the CPU 20 causes the projection image processing unit 12 of the projection unit 17 to project a totally black image such that all pixels of the image, which is displayed by the micromirror element 13, have a gray scale of 0 [%] of the full gray scale with respect to each of the primary color components of R, G and B (step S104). Specifically, the non-projection state is set. This aims at decreasing the target value as low as possible, and making the black after the color correction as dark as possible.

Even in such projection of the totally black image, that is, even in the non-projection state, there is an influence of environment light, such as illuminance. Thus, there is a case in which the black image after the color correction has about 10% of the full gray scale, and the pixel value of the photography image of the digital camera DC does not become 0.

In the projection state (dark time) of this black image, the digital camera DC is instructed, via the image input unit 11, to photograph an image including the projection range PA of the wall surface WL. Photography by this instruction is executed, and image data, which is sent from the digital camera DC, is acquired (step S105).

The CPU 20 sorts the pixel values with respect to each of all pixels and all primary color components, which constitute the projection range PA recognized in step S103, and holds the result of sorting (color information such as a color distribution) (step S106).

For example, the case is assumed in which the pixel value of a certain pixel in the photography image for the black image is (R, G, B)=(31, 27, 24) in an 8-bit gray scale "0 (zero gray scale value)"~"255 (full gray scale value)" with respect to each of the primary colors. In this case, in order to project uniform black in the entire image including the position of this pixel, it is assumed that R, B and G need to have the same value. Based on this assumption, the maximum gray scale value "31" is treated as illuminance information of the black pixel at the position of this pixel. Specifically, (R, G, B)=(31, 31, 31) is treated as illuminance information of the black pixel at the position of this pixel.

In the meantime, G has a high relative luminosity, compared to R and B. Thus, the gray scale value "27" of G may be treated as the illuminance information of the black pixel at the position of this pixel. In this case, (R, G, B)=(27, 27, 27) is treated as the illuminance information of the black pixel at the position of this pixel. It should be noted, however, that the gray scale value of G can be treated when the gray scale value of R or B is within a predetermined range (e.g. a value within ±20%) relative to the gray scale value of G.

Alternatively, an average gray scale value of R, G and B may be treated as the illuminance information of the black pixel at the position of this pixel. This method is also effective when this average gray scale value is treated not only as the illuminance information of the black pixel, but also as the illuminance information of the white pixel.

Figure 5:
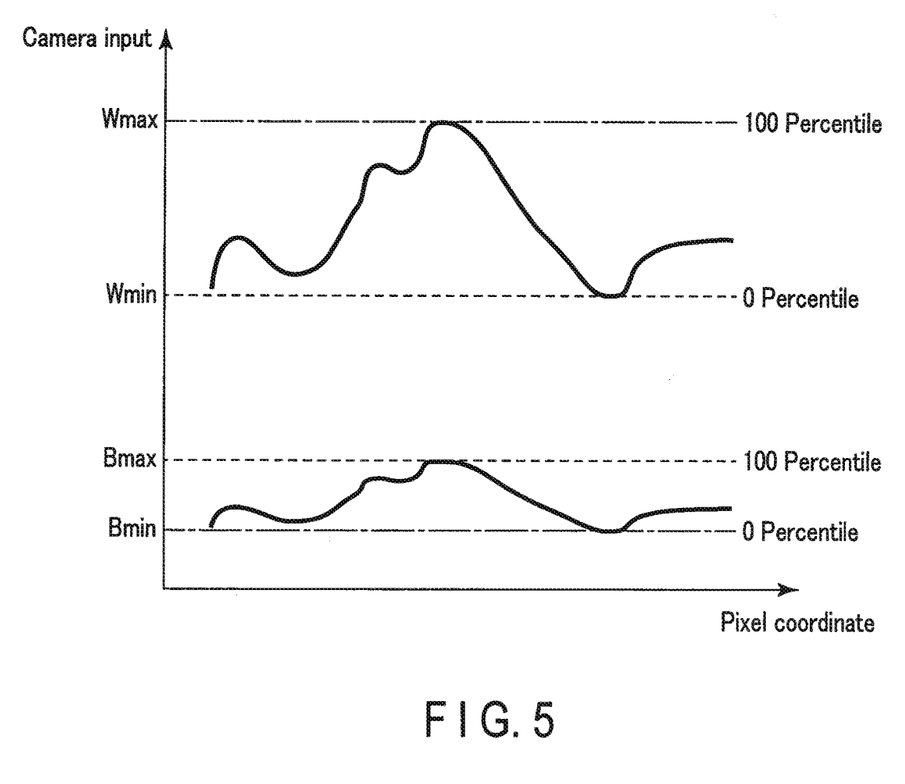
FIG. 5 is a view illustrating illuminance information of white pixels and illuminance information of black pixels, with R, G and B being totaled in each pixel, the illuminance information being acquired in the first operation example according to the embodiment.

FIG. 5 is a view illustrating illuminance information of white pixels and illuminance information of black pixels, with R, G and B being totaled in each pixel, the illuminance information being acquired in the process of the above steps S101 to S106.

An upper part of FIG. 5 illustrates a sort result of pixels of the white image acquired in the process of steps S101 to S103, in a range of Wmax to Wmin. Specifically, the distribution (variance) of measurement values is rearranged into a range from small numerals to large numerals, and is displayed by percentage. Thereby, a unit of percentile is used, which measures a position in the measurement values which are rearranged into numerals from small ones to large ones. Accordingly, in the percentile, a 100 percentile is set at the maximum value Wmax, and a 0 percentile is set at the minimum value Wmin.

A lower part of FIG. 5 illustrates a sort result of pixels of the black image acquired in the process of steps S104 to S106, in a range of Bmax to Bmin. Accordingly, in the percentile, a 100 percentile is set at the maximum value Bmax, and a 0 percentile is set at the minimum value Bmin.

Here, the CPU 20 causes the projection unit 17 to project an image including a message which prompts the person, who installed the projector apparatus 10, to select a projection mode (step S107). Then, the CPU 20 judges whether an input for selection was actually executed by the operation unit 23 (step S108).

It is assumed that there are three projection modes for selection. One projection mode is a brightness priority mode for placing priority on the brightness, above all, of the projection image, for example, in such a case that the projector apparatus 10 is used for presentation in a relatively light room or the like. Another is a color priority mode for faithfully reproducing the color of the input image, by eliminating, as much as possible, the influence of the color or pattern of the wall surface WL itself. The other is a contrast priority mode for imparting a brightness/darkness contrast and sharpness to the projected image, rather than placing priority on the color or brightness.

If it is judges that the input for selection is not executed (No in step S108), the CPU 20 returns to the process of step S107, and keeps the projection of the image for prompting the selection of the projection mode.

In this manner, the CPU 20 repeatedly executes the process of steps 107 and 108, and stands by until the input for selection is executed, while projecting the image for prompting the selection of the projection mode.

In addition, at a time point when it is judged that the input for selection of the projection mode was executed (Yes in step S108), the CPU 20 determines the gray level of the target value of the brightest white pixel of an image which is subsequently projected and the gray level of the target value of the darkest black pixel of this image in accordance with the selected and input projection mode, and sets them in the projection image processing unit 12 of the projection unit 17 (step S109). Thus, the CPU 20 finishes the process of FIG. 4, and transitions to a normal projection operation for executing projection corresponding to an image signal which is input to the image input unit 11.

When the projection operation, which was selected and input, is the brightness priority mode, the gray scale value of the white pixel, the threshold of which is set at, e.g. a 10 percentile, is acquired as the gray level of the target value of the brightest white pixel, and this gray level is set as an upper-limit target value. On the other hand, the gray scale value of the black pixel, the threshold of which is set at, e.g. a 90 percentile, is acquired as the gray level of the target value of the darkest black pixel, and this gray level is set as a lower-limit target value. In this manner, by acquiring the gray scale value of the white pixel, the threshold of which is set at the 10 percentile, and setting this gray scale value as the upper-limit target value, 90% of the color of the pattern, etc. can be eliminated. By executing this setting, the width of the range of gray scale values of the image, which is projected, is at a higher position, and the whole projected image is made bright.

In addition, when the projection operation, which was selected and input, is the color priority mode, the gray scale value of the white pixel, the threshold of which is set at a lowest 0.01 percentile, is acquired as the gray level of the target value of the brightest white pixel, and this gray level is set as an upper-limit target value. On the other hand, the gray scale value of the black pixel, the threshold of which is set at a highest 99.9 percentile, is acquired as the gray level of the target value of the darkest black pixel, and this gray level is set as a lower-limit target value. With this setting, the dynamic range becomes narrow. However, the influence of the color or pattern of the wall surface WL itself can be eliminated as much as possible, and the color information, which the input image signal has inherently, can be faithfully reproduced.

Furthermore, when the projection operation, which was selected and input, is the contrast priority mode, the gray scale value of the white pixel, the threshold of which is set at, e.g. a 10 percentile, is acquired as the gray level of the target value of the brightest white pixel, and this gray level is set as an upper-limit target value. On the other hand, the gray scale value of the black pixel, the threshold of which is set at, e.g. a 0.01 percentile, is acquired as the gray level of the target value of the darkest black pixel, and this gray level is set as a lower-limit target value. In this manner, since a very small value, or the 0.01 percentile, is set as the threshold of the gray level of the target value of the darkest black pixel, the black can be made darker. Accordingly, the contrast can be made higher. Incidentally, since there is a case in which an abnormal value exists, the 0 percentile is not used as the threshold.

With the above setting, the projected image undergoes the influence of the color or pattern of the wall surface WL itself. However, the dynamic range is increased, the range of the gray scale that can be expressed is increased, and sharpness is imparted to the projected image. Incidentally, switching may be made possible between the use and non-use of these projection modes.

Second Operation Example

Next, a second operation example of the present embodiment will be described.

Here, an operation in the following case will be described with reference to the drawings. In this case, in the initial setting before starting the projection of an arbitrary image by the projector apparatus 10, the projector apparatus 10 and digital camera DC are installed as illustrated in FIG. 1. In addition, the color correction state in the projector apparatus 10 is set in accordance with the state of the wall surface WL.

In the meantime, in the present operation example, instead of the above-described first operation example, the case will be described in which a surrounding color reflection mode is set in the ON state. In this surrounding color reflection mode, a surrounding color outside the projection range PA on the wall surface WL is reflected on the projected content.

Figure 6:
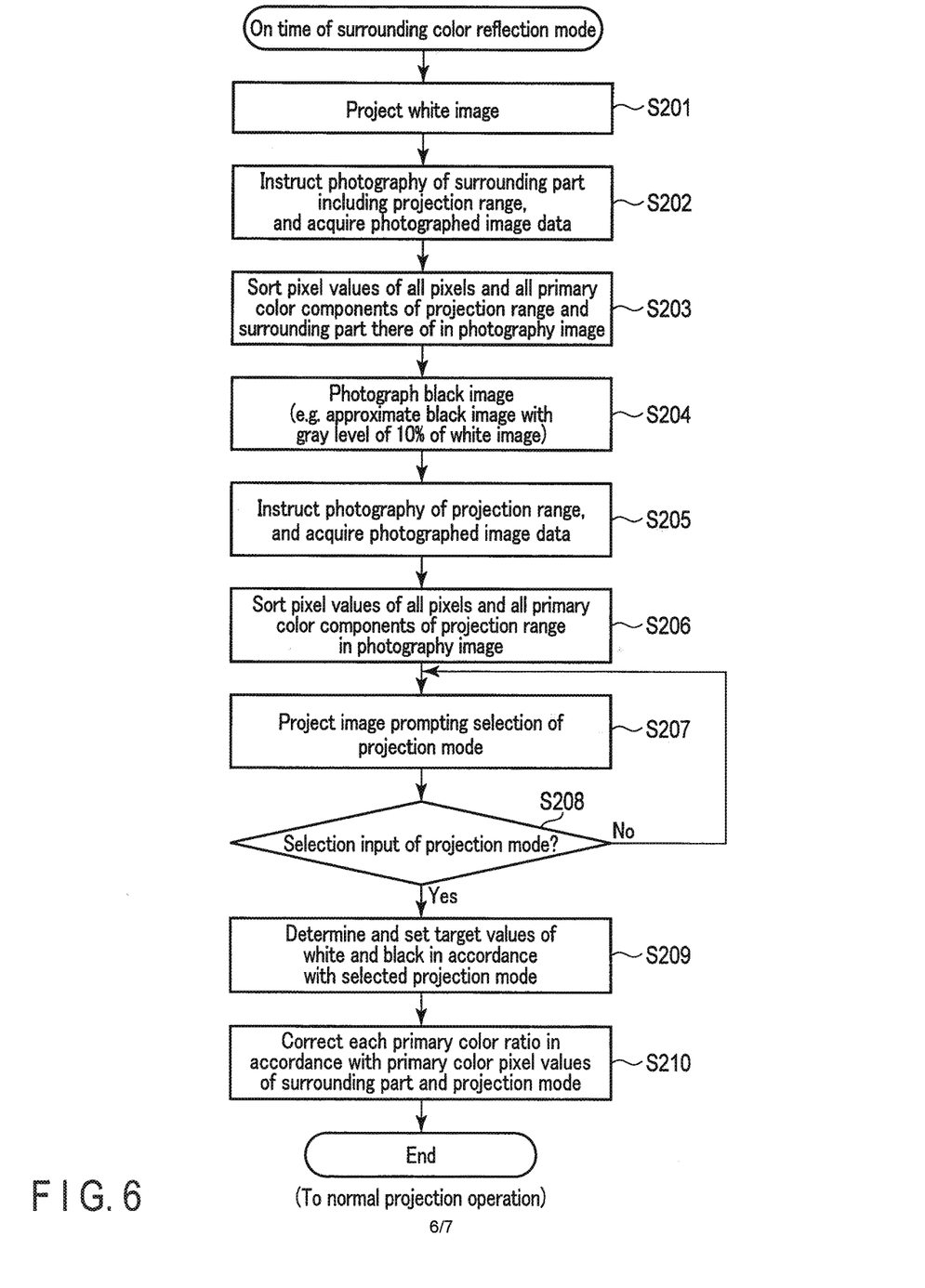
FIG. 6 is a flowchart illustrating a processing content in a second operation example according to the embodiment.

FIG. 6 is a flowchart illustrating a process content which is executed after the CPU 20 reads out the color-correction setting program 22A from the SSD 22, and develops and stores this program 22A in the main memory 21.

To start with, the CPU 20 causes the projection image processing unit 12 of the projection unit 17 to project a totally white image such that all pixels of the image, which is displayed by the micromirror element 13, have a full gray scale with respect to each of the primary color components of R, G and B (step S201).

In the projection state of this white image, the digital camera DC is instructed, via the image input unit 11, to photograph an image including the projection range PA of the wall surface WL and a surrounding area of the projection range PA. Photography by this instruction is executed, and image data, which is sent from the digital camera DC, is acquired (step S202).

The CPU 20 executes a contour extraction process with respect to each of pixel values in the acquired image data, and distinguishes and recognizes the projection range PA and the surrounding thereof. Then, the CPU 20 sorts the pixel values with respect to each of all pixels and all primary color components, which constitute the projection range PA and the surrounding thereof, and holds the result of sorting (step S203).

Next, the CPU 20 causes the projection image processing unit 12 of the projection unit 17 to project an approximate, totally black image such that all pixels of the image, which is displayed by the micromirror element 13, have a gray scale of 0 [%] of the full gray scale with respect to each of the primary color components of R, G and B (step S204). Specifically, the non-projection state is set.

In the projection state of this black image, the digital camera DC is instructed, via the image input unit 11, to photograph an image including the projection range PA of the wall surface WL. Photography by this instruction is executed, and image data, which is sent from the digital camera DC, is acquired (step S205).

The CPU 20 sorts the pixel values with respect to each of all pixels and all primary color components, which constitute the projection range PA recognized in step S203, and holds the result of sorting (step S206)

Here, the CPU 20 causes the projection unit 17 to project an image including a message which prompts the person, who installed the projector apparatus 10, to select a projection mode (step S207). Then, the CPU 20 judges whether an input for selection was actually executed by the operation unit 23 (step S208).

It is assumed that there are three projection modes for selection. One projection mode is a brightness priority mode for placing priority on the brightness, above all, of the projection image, for example, in such a case that the projector apparatus 10 is used for presentation in a relatively light room or the like. Another is a color priority mode for faithfully reproducing the color of the input image, by eliminating, as much as possible, the influence of the color or pattern of the wall surface WL itself. The other is a contrast priority mode for imparting a brightness/darkness contrast and sharpness to the projected image, rather than placing priority on the color or brightness.

If it is judges that the input for selection is not executed (No in step S208), the CPU 20 returns to the process of step S207, and keeps the projection of the image for prompting the selection of the projection mode.

In this manner, the CPU 20 repeatedly executes the process of steps 207 and 208, and stands by until the input for selection is executed, while projecting the image for prompting the selection of the projection mode.

In addition, at a time point when it is judged that the input for selection of the projection mode was executed (Yes in step S208), the CPU 20 determines the gray level of the target value of the brightest white pixel of an image which is subsequently projected and the gray level of the target value of the darkest black pixel of this image in accordance with the selected and input projection mode (step S209).

When the projection operation, which was selected and input, is the brightness priority mode, the gray scale value of the white pixel, the threshold of which is set at, e.g. a 10 percentile, is acquired as the gray level of the target value of the brightest white pixel, and this gray level is set as an upper-limit target value. On the other hand, the gray scale value of the black pixel, the threshold of which is set at, e.g. a 90 percentile, is acquired as the gray level of the target value of the darkest black pixel, and this gray level is set as a lower-limit target value.

In addition, when the projection operation, which was selected and input, is the color priority mode, the gray scale value of the white pixel, the threshold of which is set at a lowest 0.01 percentile, is acquired as the gray level of the target value of the brightest white pixel, and this gray level is set as an upper-limit target value. On the other hand, the gray scale value of the black pixel, the threshold of which is set at a highest 99.9 percentile, is acquired as the gray level of the target value of the darkest black pixel, and this gray level is set as a lower-limit target value.

Furthermore, when the projection operation, which was selected and input, is the contrast priority mode, the gray scale value of the white pixel, the threshold of which is set at, e.g. a 10 percentile, is acquired as the gray level of the target value of the brightest white pixel, and this gray level is set as an upper-limit target value. On the other hand, the gray scale value of the black pixel, the threshold of which is set at, e.g. a 0.01 percentile, is acquired as the gray level of the target value of the darkest black pixel, and this gray level is set as a lower-limit target value.

Furthermore, in accordance with the sort result of the pixel values which was held in step S203 with respect to each of all pixels and all primary color components which constitute the surrounding area of the projection range PA, and in accordance with the selected projection mode, the CPU 20 corrects the primary color ratio with respect to the gray level of the target value of the brightest white pixel and the gray level of the target value of the darkest black pixel, which were determined in step S209, and then sets the corrected primary color ratio in the projection image processing unit 12 of the projection unit 17 (step S210). Thus, the CPU 20 finishes the process of FIG. 6, and transitions to a normal projection operation for executing projection corresponding to an image signal which is input to the image input unit 11. Incidentally, switching may be made possible between the use and non-use of these projection modes.

Figure 7A:
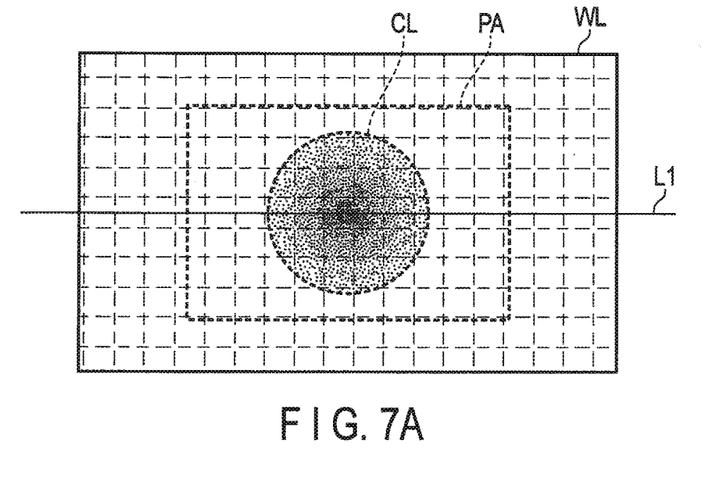
FIG. 7A is a view for describing a process of color correction on a projection content in accordance with a surrounding area of a projection range in the second operation example according to the embodiment, the view illustrating a state in which a blackish pattern of a circle CL exists at a substantially central position of a projection range PA, when a projector apparatus 10 was disposed toward a totally yellowish wall surface WL and the projection range PA was set.
Figure 7B:
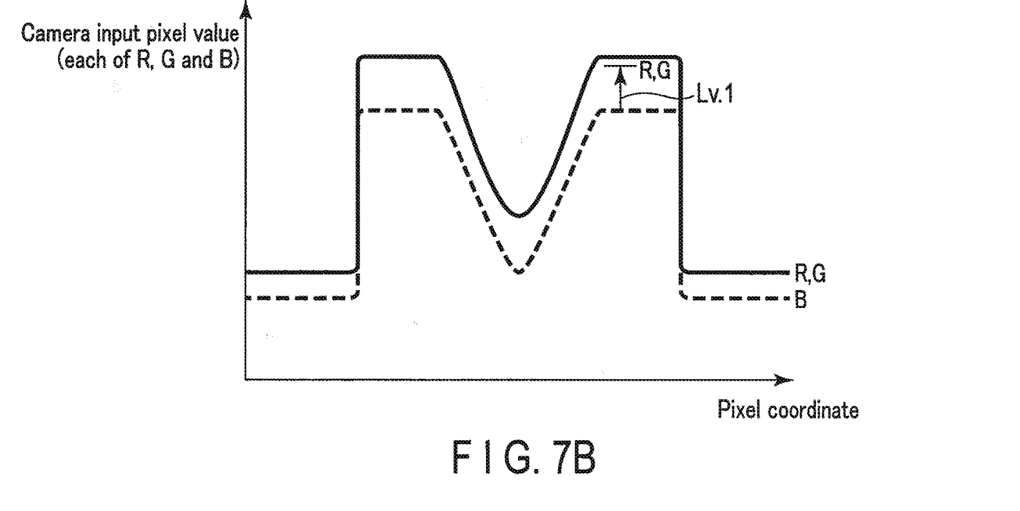
FIG. 7B is a view illustrating characteristics of pixel values of respective primary color components of R, G and B at respective pixel positions in a photography image along a line L1 which traverses a substantially central part in FIG. 7A.

FIG. 7A and FIG. 7B are views for describing a color correction process on the projection content in accordance with the surrounding area of the projection range PA. For example, it is assumed that the projector apparatus 10 is disposed to face a totally yellow wall surface WL as illustrated in FIG. 7A, and a projection range PA is set. In addition, it is assumed that a blackish pattern of a circle CL as illustrated in FIG. 7A is included in the wall surface WL at a substantially central position of the projection range PA.

In this case, it is assumed that the pixel values of primary color components of R, G and B at the respective pixel positions in the photography image along a line L1, which traverses a substantially central part of FIG. 7A, have characteristics as illustrated in FIG. 7B. Specifically, the pixel values of the primary color components of R, G and B increase or decrease, depending on the positional relationship between the inside/outside of the projection range PA and the circle CL at the substantially central part of the projection range PA. However, as a whole, due to the influence of yellow that is the background color of the wall surface WL, the pixel value of the primary color, or B (blue) in this case, which is considered to be close to a complementary color to yellow and considered not to include this background color component, is relatively lower than the pixel value of each of the other primary colors R (red) and G (green) which are considered to include the background color component.

When only the image projected within the projection range PA is simply considered, it appears that, by adjusting and decreasing each of the pixel values of primary colors R (red) and G (green) to the same level as the pixel value of B (blue), the color tone of the original image signal can correctly be reproduced as a result.

However, in the actual projection environment, the surrounding part on the outside of the projection range PA on the wall surface WL also enters the view field of the viewer AM at the same time, although the viewer AM is unconscious of this. In particular, in the environment in which the projection environment by the projector apparatus 10 is bright and the influence of the surrounding part on the outside of the projection range PA on the wall surface WL is considered to be great, the image projected within the projection range PA is, for the viewer AM, influenced by the background color of the wall surface WL of the surrounding part outside the projection range PA. Accordingly, the background color of the wall surface WL appears with a tint of the complementary color. Specifically, when the background color of the wall surface WL is yellow as illustrated in FIG. 7, the image projected within the projection range PA appears with a tint of blue that is the complementary color to yellow.

Thus, in accordance with the projection mode selected at that time point, the CPU 20 needs to execute color correction for emphasizing, in this example, the primary colors R and G of the pixel values in the image projected by the projector apparatus 10, compared to the primary color B. As illustrated in FIG. 7B, an adjustment width Lv.1 for emphasis in this case is set to fall within a width which is obtained by subtracting the primary color B from the primary colors R and G of the original pixel values. In addition, in accordance with the absolute values of brightness of the projection modes, the adjustment width Lv.1 is set to become larger in the order of the brightness priority mode, contrast priority mode and color priority mode.

Advantageous Effects

As has been described above in detail, according to the present embodiment, it is possible to perform projection even on a projection target object that is not an exclusive-use screen and has a color, a pattern, a stain, etc., with an image quality on which a user's intention is reflected.

In the meantime, although not described in the embodiment, when the gray level of the target value of the brightest white pixel of the image which is projected and the gray level of the target value of the darkest black pixel of this image are determined, the minimum value of the width of the gray scale may be preset as a threshold. The gray level of the target value of the white pixel and the gray level of the target value of the black pixel may be determined so as not to fall below the threshold. Thereby, the minimum necessary contrast can be secured.

In addition, in the second operation example, the color correction of the image which is projected within the projection range PA is executed by further considering the background color of the surrounding area on the outside of the projection range PA of the wall surface WL. Thus, in accordance with the actual projection environment, a projection image with a natural hue can be provided without giving unnatural feeling to the viewer AM.

Furthermore, in the second operation example, the case was described in which the background color of the surrounding area on the outside of the projection range PA of the wall surface WL is acquired by photography. However, when the wall surface WL has substantially similar colors or patterns between the inside and outside of the projection range PA, the information indicative of the state of the inside of the projection range PA may be substituted for the information indicative of the state of the surrounding area outside the projection range PA. Thereby, the process by the CPU 20 can be simplified, and the reduction of the load on the CPU 20 and the decrease in time for the initial setting can be realized.

In the present embodiment, the case was described in which the present invention is applied to the projector apparatus 10 of a DLP (trademark) (Digital Light Processing) method using a semiconductor light-emitting element. However, in the present invention, there are no restrictions to the light-emitting element, the projection method, etc.

Besides, the present invention is not limited to the above-described embodiments. In practice, various modifications may be made without departing from the spirit of the invention. In addition, the embodiments may properly be combined as much as possible and implemented, and, in such cases, the combined advantageous effects can be obtained. Furthermore, the embodiments include inventions in various stages, and various inventions can be derived from proper combinations of structural elements disclosed herein. For example, even if some structural elements are omitted from all the structural elements disclosed in the embodiments, if the problem described in this specification can be solved and the advantageous effects described in this specification can be achieved, the structure, from which such structural elements are omitted, can be derived as an invention.

What is claimed is:

1. A projection apparatus comprising:
a projection unit configured to project an image;
a projection image acquisition unit configured to acquire a projection image on a projection target surface on which the image was projected by the projection unit;
a projection surface information acquisition unit configured to acquire, from the projection image acquired by the projection image acquisition unit, color information at a bright time and a dark time on the projection target surface;
a projection mode designation unit configured to designate one of a plurality of projection modes which designate at least one of a brightness and a color of the image which is projected by the projection unit; and
a projection control unit configured to determine, based on the color information of the projection target surface acquired by the projection surface information acquisition unit and the projection mode designated by the projection mode designation unit, a gray scale range of each of colors constituting the image which is projected by the projection unit, and configured to cause the projection unit to project the image.

2. The projection apparatus of claim 1, wherein the projection control unit is configured to determine, by a percentile, an upper limit value and a lower limit value of the gray scale range of each of the colors constituting the image which is projected by the projection unit.

3. The projection apparatus of claim 2, wherein the plurality of projection modes include a brightness priority mode, a color priority mode, and a contrast priority mode, and
the upper limit value of the gray scale range of each of the colors, which is determined by the percentile, is smallest in the color priority mode, and the lower limit value of the gray scale range of each of the colors, which is determined by the percentile, is highest in the color priority mode.

4. The projection apparatus of claim 3, wherein the projection control unit is configured to limit a minimum width of the gray scale range of each of the colors constituting the image which is projected by the projection unit.

5. The projection apparatus of claim 4, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

6. The projection apparatus of claim 5, wherein the projection surface information acquisition unit is configured to acquire color information of an inside of a range of the projection image as a substitute for color information of an outside of the projection image.

7. The projection apparatus of claim 3, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

8. The projection apparatus of claim 7, wherein the projection surface information acquisition unit is configured to acquire color information of an inside of a range of the projection image as a substitute for color information of an outside of the projection image.

9. The projection apparatus of claim 2, wherein the projection control unit is configured to limit a minimum width of the gray scale range of each of the colors constituting the image which is projected by the projection unit.

10. The projection apparatus of claim 9, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

11. The projection apparatus of claim 10, wherein the projection surface information acquisition unit is configured to acquire color information of an inside of a range of the projection image as a substitute for color information of an outside of the projection image.

12. The projection apparatus of claim 2, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

13. The projection apparatus of claim 12, wherein the projection surface information acquisition unit is configured to acquire color information of an inside of a range of the projection image as a substitute for color information of an outside of the projection image.

14. The projection apparatus of claim 1, wherein the projection control unit is configured to limit a minimum width of the gray scale range of each of the colors constituting the image which is projected by the projection unit.

15. The projection apparatus of claim 14, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

16. The projection apparatus of claim 15, wherein the projection surface information acquisition unit is configured to acquire color information of an inside of a range of the projection image as a substitute for color information of an outside of the projection image.

17. The projection apparatus of claim 1, wherein the projection image acquisition unit is configured to acquire, together with the projection image on the projection target surface, an image of a surrounding area on an outside of the projection image on the projection target surface,
the projection surface information acquisition unit is configured to further acquire color information from the image of the surrounding area on the outside of the projection image acquired by the projection image acquisition unit, and
the projection control unit is configured to determine, based on each color information of an inside and an outside of a range of the projection image on the projection target surface acquired by the projection surface information acquisition unit and the projection mode designated by the projection mode designation unit, the gray scale range of each of the colors constituting the image which is projected by the projection unit, and configured to cause the projection unit to project the image.

18. The projection apparatus of claim 17, wherein the projection surface information acquisition unit is configured to acquire color information of an inside of a range of the projection image as a substitute for color information of an outside of the projection image.

19. A projection method for an apparatus including a projection unit configured to project an image, the method comprising:
acquiring a projection image on a projection target surface on which the image was projected by the projection unit;
acquiring, from the projection image which is acquired in the acquiring the projection image, color information at a bright time and a dark time on the projection target surface;
designating one of a plurality of projection modes which designate at least one of a brightness and a color of the image which is projected by the projection unit; and
determining, based on the color information of the projection target surface which is acquired in the acquiring the color information and the projection mode which is designated in the designating the one of the plurality of projection modes, a gray scale range of each of colors constituting the image which is projected by the projection unit, and causing the projection unit to project the image.

20. A non-transitory computer-readable storage medium having a program stored thereon which controls a computer incorporated in an apparatus including a projection unit configured to project an image, to perform functions comprising:
a projection image acquisition unit configured to acquire a projection image on a projection target surface on which the image was projected by the projection unit;
a projection surface information acquisition unit configured to acquire, from the projection image acquired by the projection image acquisition unit, color information at a bright time and a dark time on the projection target surface;
a projection mode designation unit configured to designate one of a plurality of projection modes which designate at least one of a brightness and a color of the image which is projected by the projection unit; and
a projection control unit configured to determine, based on the color information of the projection target surface acquired by the projection surface information acquisition unit and the projection mode designated by the projection mode designation unit, a gray scale range of each of colors constituting the image which is projected by the projection unit, and configured to cause the projection unit to project the image.

* * * * *